(12) United States Patent
Meng

(10) Patent No.: US 10,178,659 B2
(45) Date of Patent: Jan. 8, 2019

(54) DEVICE AND METHOD OF HANDLING SHORTENED ENHANCED PHYSICAL DOWNLINK CONTROL CHANNEL TRANSMISSION

(71) Applicant: HTC Corporation, Taoyuan (TW)

(72) Inventor: Ling-San Meng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 155 days.

(21) Appl. No.: 15/346,740

(22) Filed: Nov. 9, 2016

(65) Prior Publication Data
US 2017/0135077 A1    May 11, 2017

Related U.S. Application Data

(60) Provisional application No. 62/252,583, filed on Nov. 9, 2015.

(51) Int. Cl.
*H04W 72/04* (2009.01)
*H04L 5/00* (2006.01)

(52) U.S. Cl.
CPC .......... *H04W 72/042* (2013.01); *H04L 5/001* (2013.01); *H04L 5/0048* (2013.01); *H04L 5/0053* (2013.01); *H04L 5/0094* (2013.01); *H04L 5/0007* (2013.01); *H04L 5/0041* (2013.01); *H04L 5/0042* (2013.01)

(58) Field of Classification Search
CPC .. H04W 72/042; H04L 5/0053; H04L 5/0048; H04L 5/001; H04L 5/0094; H04L 5/0041; H04L 5/0042; H04L 6/007
See application file for complete search history.

(56) References Cited

U.S. PATENT DOCUMENTS

2015/0117356 A1    4/2015 Kim
2017/0290008 A1*  10/2017 Tooher .............. H04W 72/0446
2017/0325231 A1*  11/2017 Sorrentino ............. H04L 5/001

FOREIGN PATENT DOCUMENTS

WO    2014016672 A1    1/2014

OTHER PUBLICATIONS

Search Report dated Jan. 23, 2017 for EP application No. 16197916.6, pp. 1-14.

(Continued)

*Primary Examiner* — Walter J Divito
*Assistant Examiner* — Anthony Luo
(74) *Attorney, Agent, or Firm* — Winston Hsu

(57) ABSTRACT

A network of handling a sEPDCCH transmission comprises instructions of determining a duration of a sTTI; determining the number of a plurality of available REs of a plurality of REs in a sSU, $n_{EPDCCH}$; determining an AL of the sSU, Q; determining the number of a plurality of ECCEs in an aggregated sSU, K; determining the number of a plurality of EREGs in an ECCE, A; numbering a plurality of available REs in the aggregated sSU from 0 to (A*K−1) cyclically; arranging the plurality of EREGs numbered with 0 to (A*K−1) according to a K by A matrix; determining the number of a plurality of aggregated sSUs for performing the sEPDCCH transmission, N; determining the number of a plurality of ECCEs in N aggregated sSUs, N*K; and determining a sEPDCCH position on N*K consecutive ECCEs.

18 Claims, 9 Drawing Sheets

(56) References Cited

OTHER PUBLICATIONS

Intel Corporation, "Further details of partial subframe", 3GPP TSG RAN WG1 Meeting#83, R1-156517, Nov. 15-22, 2015, Anaheim, USA, XP051042059, pp. 1-5.
Samsung, "Study on specification impact for downlink due to TTI shortening", 3GPP TSG RAN WG1 Meeing #83, R1-156819, Nov. 15-22, 2015, Anaheim, USA, XP051022155, pp. 1-5.
ETRI, "Discussion on TTI shortening", 3GPP TSG RAN WG1 Meeting #83, R1-157110, Nov. 16-20, 2015, Anaheim, USA, XP051042141, pp. 1-7.
3GPP TSG RAN Meeting #67 RP-150465 Mar. 9-12, 2015.
3GPP TS 36.212 V12.5.0 (Jun. 2015).
3GPP TS 36.213 V12.5.0 (Mar. 2015).
Office action dated Aug. 30, 2018 for EP application No. 16197916. 6, pp. 1-7.
Nokia Networks, "On required physical layer enhancements for TTI shortening", 3GPP TSG-RAN WG1 Meeting #83, R1-157294, Nov. 15-22, 2015, Anaheim, USA, XP051022218, pp. 1-4.

\* cited by examiner

| EREG 1 | EREG 3 | EREG 5 | EREG 7 | — ECCE 1 |
| EREG 0 | EREG 2 | EREG 4 | EREG 6 | — ECCE 0 |

FIG. 6

DEVICE AND METHOD OF HANDLING SHORTENED ENHANCED PHYSICAL DOWNLINK CONTROL CHANNEL TRANSMISSION

CROSS REFERENCE TO RELATED APPLICATIONS

This application claims the benefit of U.S. Provisional Application No. 62/252,583, filed on Nov. 9, 2015, which is incorporated herein by reference.

BACKGROUND OF THE INVENTION

1. Field of the Invention

The present invention relates to a communication device and a method used in a wireless communication system, and more particularly, to a communication device and method of handling a shortened enhanced physical downlink control channel transmission in a wireless communication system.

2. Description of the Prior Art

Latency reduction is considered as a target for improving user experience regarding a wireless communication system. Latency reduction may be realized by shortening a transmission time interval (TTI) defined in the 3rd Generation Partnership Project (3GPP) standard to a shorter TTI. However, it is still unknown how to transmit/receive a shortened enhanced physical downlink control channel (sEPDCCH) according to the shorter TTI. Thus, the sEPDCCH may not be transmitted/received properly. As a result, resource(s) cannot be exploited efficiently, and scheduling performance is degraded.

Thus, how to handle a shortened enhanced physical downlink control channel transmission is an important problem to be solved.

SUMMARY OF THE INVENTION

The present invention therefore provides a method and related communication device for handling a shortened enhanced physical downlink control channel transmission to solve the abovementioned problem.

A network of handling a shortened enhanced physical downlink control channel (sEPDCCH) transmission comprises a storage unit for storing instructions and a processing circuit coupled to the storage unit. The processing means is configured to execute the instructions stored in the storage unit. The instructions comprise determining a duration of a shortened transmission time interval (sTTI); determining the number of a plurality of available resource elements (REs) of a plurality of REs in a shortened scheduling unit (sSU), $n_{EPDCCH}$, according to the sTTI and an availability of the plurality of REs; determining an aggregated level (AL) of the sSU, Q, according to the sTTI and $n_{EPDCCH}$; determining the number of a plurality of enhanced control channel elements (ECCEs) in an aggregated sSU, K, according to $n_{EPDCCH}$ and Q; determining the number of a plurality of enhanced resource element groups (EREGs) in an ECCE, A, according to $n_{EPDCCH}$, Q and K; numbering a plurality of available REs in the aggregated sSU from 0 to (A*K−1) cyclically, wherein the plurality of available REs in the aggregated sSU numbered with 0 to (A*K−1) constitute a plurality of EREGs numbered with 0 to (A*K−1) according to the same number; arranging the plurality of EREGs numbered with 0 to (A*K−1) according to a K by A matrix, wherein the plurality of EREGs numbered with 0 to (A*K−1) corresponding to a jth row of the K by A matrix constitute one of the plurality of ECCEs numbered with j; determining the number of a plurality of aggregated sSUs for performing the sEPDCCH transmission, N, according to channel bandwidth, channel state information (CSI) and downlink control information (DCI); determining the number of a plurality of ECCEs in N aggregated sSUs, N*K; and determining a sEPDCCH position on N*K consecutive ECCEs.

A communication device of handling a shortened enhanced physical downlink control channel (sEPDCCH) reception comprises a storage unit for storing instructions and a processing circuit coupled to the storage unit. The processing means is configured to execute the instructions stored in the storage unit. The instructions comprise receiving a duration of a shortened transmission time interval (sTTI); receiving an aggregated level (AL) of a shortened scheduling unit (sSU), Q; receiving the number of a plurality of aggregated sSUs for performing the sEPDCCH reception, N; determining the number of a plurality of sSUs in N aggregated sSUs, N*Q; determining the number of a plurality of available resource elements (REs) of a plurality of REs in the sSU, $n_{EPDCCH}$, according to the sTTI and an availability of the plurality of REs; determining the number of a plurality of enhanced control channel elements (ECCEs) in an aggregated sSU, K, according to $n_{EPDCCH}$ and Q; determining the number of a plurality of ECCEs in N aggregated sSUs, N*K; determining the number of a plurality of enhanced resource element groups (EREGs) in an ECCE, A, according to $n_{EPDCCH}$, Q and K; numbering a plurality of available REs in the aggregated sSU from 0 to (A*K−1) cyclically, wherein the plurality of available REs in the aggregated sSU numbered with 0 to (A*K−1) constitute a plurality of EREGs numbered with 0 to (A*K−1) according to the same number; arranging the plurality of EREGs numbered with 0 to (A*K−1) according to a K by A matrix, wherein the plurality of EREGs numbered with 0 to (A*K−1) corresponding to a jth row of the K by A matrix constitute one of the plurality of ECCEs numbered with j; and determining a sEPDCCH position on N*K consecutive ECCEs.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 is a schematic diagram of arranging a plurality of EREGs for a plurality of ECCEs according to an example of the present invention.

DETAILED DESCRIPTION

Figure 1:
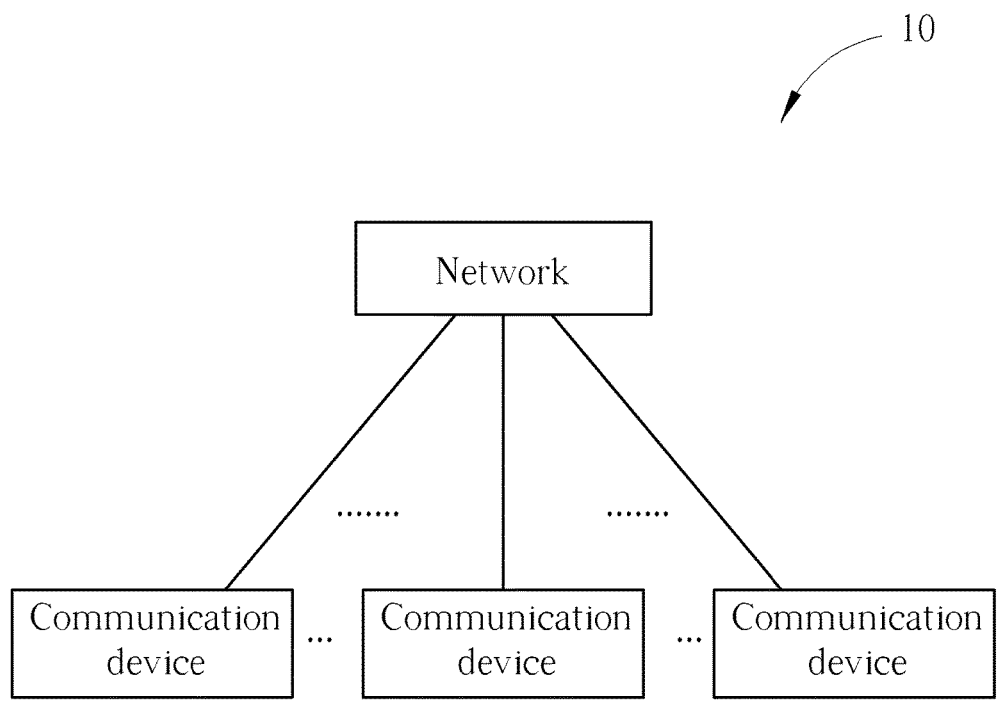
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network may be an evolved Node-B (eNB) in an evolved universal terrestrial radio access network (UTRAN) (E-UTRAN) of a long term evolution (LTE) system, or a fifth generation (5G) BS employing orthogonal frequency-division multiplexing (OFDM) and/or non-OFDM for communicating with the communication devices (e.g., transmitting/receiving a physical downlink (DL) control channel (PDCCH) and/or an enhanced PDCCH (EPDCCH)) in a system bandwidth (e.g., 20 MHz) and/or a transmission time interval (TTI) (e.g., 1 ms).

The communication device may be a user equipment (UE), a mobile phone, a laptop, a tablet computer, an electronic book, a portable computer system, a vehicle or aircraft. In addition, the network and the communication device can be seen as a transmitter or a receiver according to transmission direction, e.g., for an uplink (UL), the communication device is the transmitter and the network is the receiver, and for a DL, the network is the transmitter and the communication device is the receiver.

Figure 2:
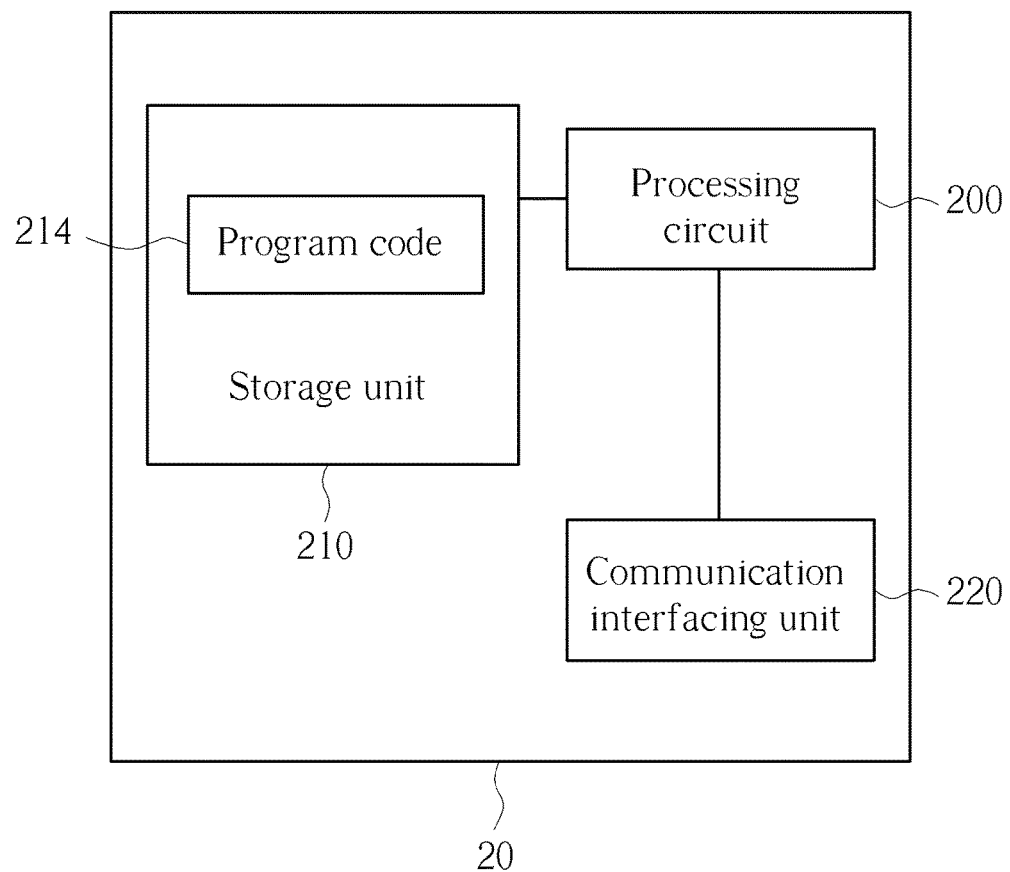
FIG. 2 is a schematic diagram of a communication device according to an example of the present invention.

FIG. 2 is a schematic diagram of a communication device 20 according to an example of the present invention. The communication device 20 may be the communication device or the network shown in FIG. 1, but is not limited herein. The communication device 20 may include a processing circuit 200 such as a microprocessor or Application Specific Integrated Circuit (ASIC), a storage unit 210 and a communication interfacing unit 220. The storage unit 210 may be any data storage device that may store a program code 214, accessed and executed by the processing circuit 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing circuit 200.

In the following embodiments, a UE is used to represent the communication device in FIG. 1, to simplify the illustration of the embodiments.

Figure 3:
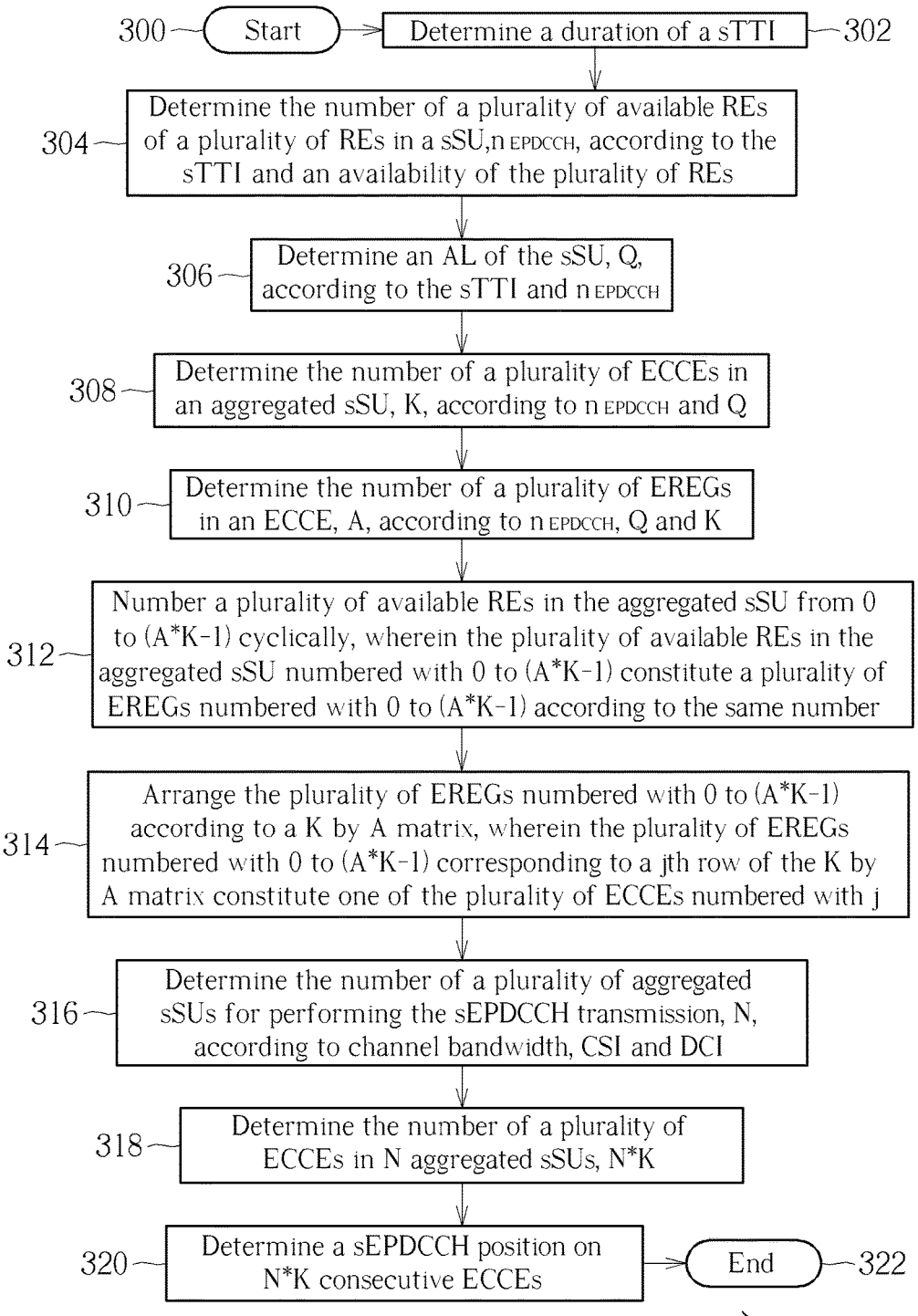
FIG. 3 is a flowchart of a process according to an example of the present invention.

FIG. 3 is a flowchart of a process 30 according to an example of the present invention. The process 30 may be utilized in a network, to handle a shortened EPDCCH (sEPDCCH) transmission in a wireless communication system. The process 30 includes the following steps:

Step 300: Start.

Step 302: Determine a duration of a shortened TTI (sTTI).

Step 304: Determine the number of a plurality of available resource elements (REs) of a plurality of REs in a shortened scheduling unit (sSU), $n_{EPDCCH}$, according to the sTTI and an availability of the plurality of REs.

Step 306: Determine an aggregated level (AL) of the sSU, Q, according to the sTTI and $n_{EPDCCH}$.

Step 308: Determine the number of a plurality of enhanced control channel elements (ECCEs) in an aggregated sSU, K, according to $n_{EPDCCH}$ and Q.

Step 310: Determine the number of a plurality of enhanced resource element groups (EREGs) in an ECCE, A, according to $n_{EPDCCH}$, Q and K.

Step 312: Number a plurality of available REs in the aggregated sSU from 0 to (A*K−1) cyclically, wherein the plurality of available REs in the aggregated sSU numbered with 0 to (A*K−1) constitute a plurality of EREGs numbered with 0 to (A*K−1) according to the same number.

Step 314: Arrange the plurality of EREGs numbered with 0 to (A*K−1) according to a K by A matrix, wherein the plurality of EREGs numbered with 0 to (A*K−1) corresponding to a jth row of the K by A matrix constitute one of the plurality of ECCEs numbered with j.

Step 316: Determine the number of a plurality of aggregated sSUs for performing the sEPDCCH transmission, N, according to channel bandwidth, channel state information (CSI) and downlink control information (DCI).

Step 318: Determine the number of a plurality of ECCEs in N aggregated sSUs, N*K.

Step 320: Determine a sEPDCCH position on N*K consecutive ECCEs.

Step 322: End.

According to the process 30, the network may determine (e.g., configure a UE) a duration of a sTTI. The network may determine (e.g., counting) the number of a plurality of REs of a plurality of REs in a sSU, $n_{EPDCCH}$, according to the sTTI and an availability of the plurality of REs. The network may determine (e.g., configure the UE) an AL of the sSU, Q, according to the sTTI and $n_{EPDCCH}$. The network may determine the number of a plurality of ECCEs in an aggregated sSU, K, according to $n_{EPDCCH}$ and Q. The network may determine (e.g., configure the UE) the number of a plurality of EREGs in an ECCE, A, according to $n_{EPDCCH}$, Q and K. Then, the network may number a plurality of available REs (e.g., which are not used for carrying necessary symbols at least for a demodulation purpose) in the aggregated sSU from 0 to (A*K−1) cyclically, wherein the plurality of available REs in the aggregated sSU numbered with 0 to (A*K−1) (e.g., i, wherein i is between 0 and (A*K−1)) constitute a plurality of EREGs numbered with 0 to (A*K−1) (e.g., i, wherein i is between 0 and (A*K−1)) according to the same number. The network may arrange the plurality of EREGs numbered with 0 to (A*K−1) according to a K by A matrix (e.g., square), wherein the plurality of EREGs numbered with 0 to (A*K−1) corresponding to a jth row of the K by A matrix constitute one of the plurality of ECCEs numbered with j. Further, the network may determine (e.g., configure the UE) the number of a plurality of aggregated sSUs for performing the sEPDCCH transmission, N, according to channel bandwidth, CSI and DCI (e.g., format and/or size), and may determine (e.g., configure the UE) the number of a plurality of ECCEs in N aggregated sSUs, N*K. Then, the network may determine a sEPDCCH position on N*K consecutive ECCEs. That is, the network and the UE are able to transmit/receive the sEPDCCH on a sEPDCCH position determined according to a sTTI, when the sTTI is used for transmitting/receiving the sEPDCCH. Thus, the sEPDCCH can be transmitted/received properly according to the process 30. As a result, the problem of the sEPDCCH transmission/reception in the prior art is solved.

Realization of the process 30 is not limited to the above description.

In on example, the duration of the sTTI may be transmitted in (e.g., signaled as) system information. For example, the duration of the sTTI may be signaled as part of system information. In one example, the duration of the sTTI may be transmitted in (e.g., signaled as) a higher layer signaling or a dynamic signaling. In one example, the duration of the sTTI may be a predetermined duration newly defined in the 3rd generation partner project (3GPP) standard. It should be noted that, the network may not need to determine the duration of the sTTI in Step 302, because the duration of the sTTI may be predetermined and is already known by the network and the UE.

In on example, the sSU may be a resource (e.g., time resource and/or frequency resource) including (e.g., corresponding to) 12 OFDM subcarriers in frequency domain. In one example, the sTTI may be shorter than a TTI (e.g., 1 ms or 14 OFDM symbols) defined in the 3GPP standard. In one example, the number of OFDM symbols in the sTTI may be less than 14 OFDM symbols according to a normal cyclic-prefix (CP) length. In one example, the number of OFDM symbols in the sTTI may be less than 12 OFDM symbols according to an extended CP length. In one example, the number of OFDM symbols in the sTTI may be 3 OFDM symbols. Accordingly, the sSU with the sTTI may correspond to 36 REs (i.e., 12*3).

In on example, the availability of the plurality of REs may be determined (e.g., counted) according to (e.g., fulfilled by) at least following conditions, such as being part of one of a plurality of EREGs in the sSU, not being used for at least one cell-specific reference signal or at least one CSI reference signal, and not being part of a control region of a PDCCH.

In on example, the AL of the sSU (i.e., Q) may be transmitted in (e.g., signaled as) system information. In one example, the AL of the sSU may be transmitted in (e.g., signaled as) a higher layer signaling or a dynamic signaling. In one example, the AL of the sSU may be a predetermined AL newly defined in the 3GPP standard. For example, Q may be 1, if the number of OFDM symbols in the sTTI is more than 7 OFDM symbols. Q may be 2, if the number of OFDM symbols in the sTTI is less than 7 OFDM symbols and more than 3 OFDM symbols. Q may be 3, if the number of OFDM symbols in the sTTI is less than 3 OFDM symbols. For another example, Q may be 1, if $n_{EPDCCH}$ is more than 84 REs. Q may be 2, if $n_{EPDCCH}$ is less than 84 REs and more than 36 REs. Q may be 3, if $n_{EPDCCH}$ is less than 36 REs. It should be noted that, the network may not need to determine the AL of the sSU (i.e., Q) in Step 306, because the AL of the sSU (i.e., Q) may be predetermined and is already known by the network and the UE.

Figure 4:
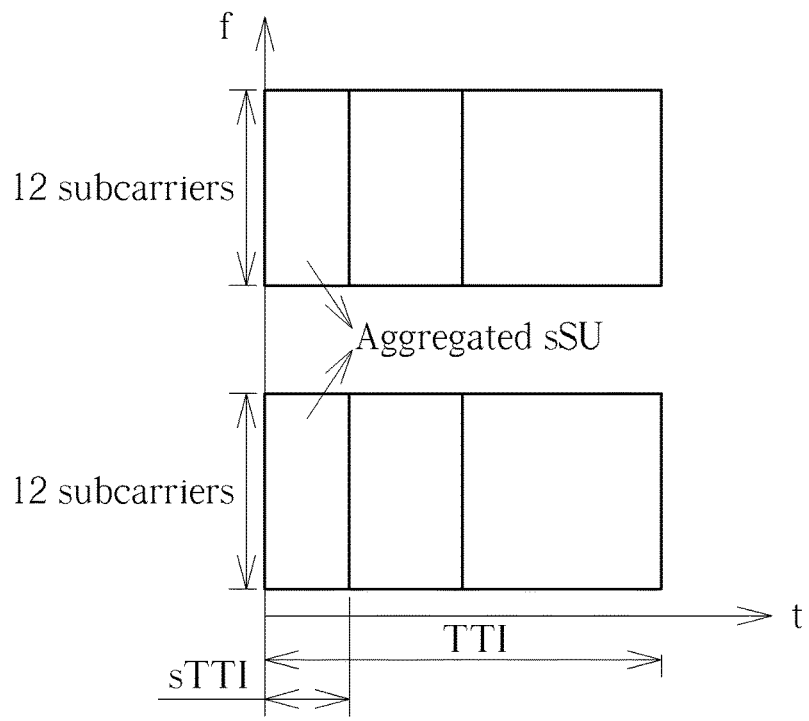
FIG. 4 is a schematic diagram of determining a location of an aggregated sSU according to an example of the present invention.

FIG. 4 is a schematic diagram of determining a location of an aggregated sSU according to an example of the present invention. In FIG. 4, X-axis represents a sTTI and a TTI (i.e., 1 ms) for a time dimension, and Y-axis represents a system bandwidth including at least two sets of 12 subcarriers for a frequency dimension. As shown by FIG. 4, 2 sSUs are included in an aggregated sSU. That is, Q=2 is obtained. Further, the aggregated sSU is located on the time resource consecutively, and is located on the frequency resource non-consecutively.

In on example, the aggregated sSU may be located (e.g., on the time resource and/or frequency resource) consecutively. In one example, the aggregated sSU may be located (e.g., on the time resource and/or frequency resource) non-consecutively. The present example can be illustrated by using FIG. 4, and is not narrated herein.

In on example, K may be determined (e.g., as a largest positive integer) according to the following equation:

$$2^d \frac{Q * n_{EPDCCH}}{K} \geq n_{threshold} \text{ and } K = 2^b; \quad \text{(Eq. 1)}$$

wherein $2^d$ is an AL of the ECCE, b and d are nonnegative integers, $n_{threshold}$ is a smallest acceptable number of a plurality of REs for transmitting the sEPDCCH.

In on example, $n_{threshold}$ may be determined according to a highest acceptable coding rate of the DCI (e.g., due to that less REs are used for coding). For example, the highest acceptable coding rate of the DCI may be 0.77. For the DCI with a total number of 40 information bits, $n_{threshold}$ is determined as 26 REs. Accordingly, a coding rate of 0.769 (i.e., 40/(26*2)~=0.769) is given.

In on example, $n_{threshold}$ is determined according to a factor (e.g., α) related to a shrunken proportion between the sTTI and a TTI defined in the 3GPP standard, and the factor is between 0 and 1.0. In one example, $n_{threshold}$ may be transmitted in (e.g., signaled as) a higher layer signaling. In one example, $n_{threshold}$ may be a predetermined factor newly defined in the 3GPP standard. It should be noted that, the network may not need to determine $n_{threshold}$, because the factor may be predetermined and is already known by the network and the UE. In one example, the factor may be 1.0 and $n_{threshold}$ may be 26 REs, if DCI formats used for the LTE system supported by reduced latency are kept unchanged (i.e., without latency reduction). In one example, the factor may be 0.5 and $n_{threshold}$ may be 13 REs, if the DCI formats used for the LTE system supported by reduced latency is shrunk to ½ of the original size.

In on example, A is determined according to the following equation:

$$A*K \leq Q*n_{EPDCCH}; \quad \text{(Eq. 2)}$$

In on example, the plurality of available REs in the aggregated sSU may be numbered from 0 to (A*K−1) cyclically and across (i.e., cross sSUs in the aggregated sSU) according to an increasing order in frequency domain (e.g., from the first position of the frequency domain) and followed by an increasing order in time domain. In on example, the plurality of available REs in the aggregated sSU may be numbered from 0 to (A*K−1) cyclically and non-across (i.e., not cross sSUs in the aggregated sSU, one sSU by one sSU) according to an increasing order in frequency domain (e.g., from the first position of the frequency) and followed by an increasing order in time domain. It should be noted that, the network may not need to determine the numbering scheme mentioned above, because the numbering scheme may be predetermined and is already known by the network and the UE.

In on example, the K by A matrix may be arranged according to an increasing order in row (e.g., first row) and followed by an increasing order in column. It should be noted that, the network may not need to determine the arrangement scheme mentioned above, because the arrangement scheme may be predetermined and is already known by the network and the UE.

Figure 5:
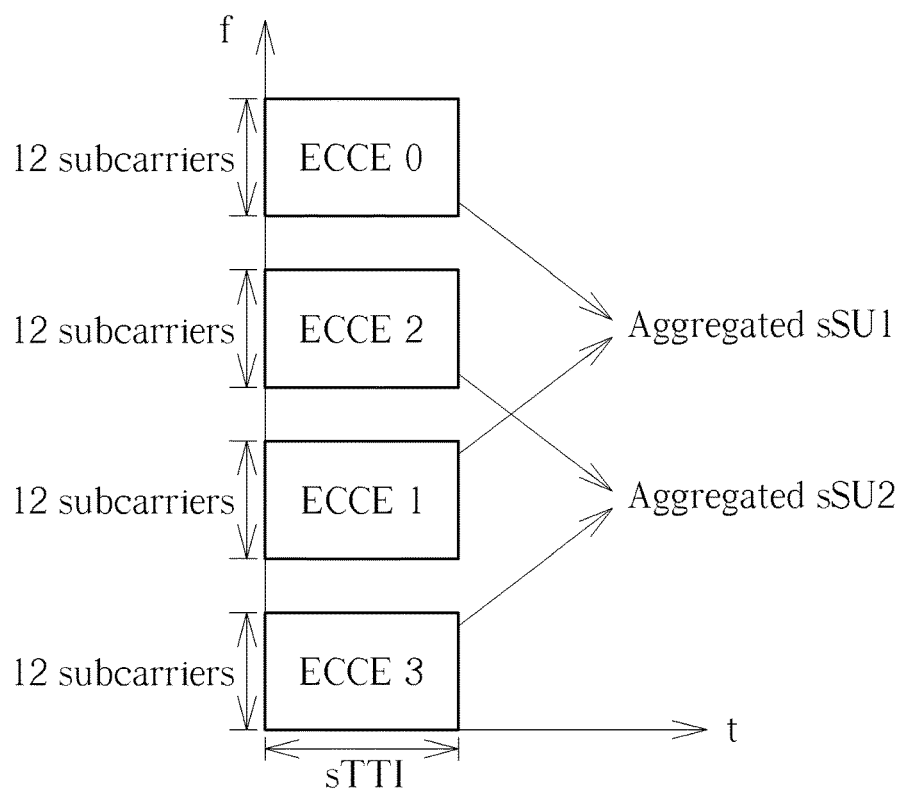
FIG. 5 is a schematic diagram of numbering a plurality of ECCEs in N aggregated sSUs according to an example of the present invention.

FIG. 5 is a schematic diagram of numbering a plurality of ECCEs in N aggregated sSUs (i.e., N*K ECCEs) according to an example of the present invention. In FIG. 5, X-axis represents a sTTI for a time dimension, and Y-axis represents a system bandwidth including at least four sets of 12 subcarriers for a frequency dimension. As shown by FIG. 5, 2 sSUs are included in an aggregated sSU, 2 ECCEs are included in an aggregated sSU, and a total number of 2 aggregated sSUs, i.e., Aggregated sSU1 and Aggregated sSU2, are used. That is, N=Q=K=2 is obtained. Accordingly, totally 4 ECCEs are included in 2 aggregated sSUs, i.e., each one sSU includes an ECCE. Thus, 4 ECCES are numbered with 0 to 3, i.e., ECCE 0-ECCE 3, from the first sSU in the Aggregated sSU1 to the last sSU in the Aggregated sSU2 across in frequency domain.

In on example, the plurality of ECCEs in N aggregated sSUs (i.e., N*K ECCEs) may be numbered from the first sSU in frequency domain (e.g., position) according to an increasing order. The present example can be illustrated by using FIG. 5, and is not narrated herein.

FIG. 6 is a schematic diagram of arranging a plurality of EREGs for a plurality of ECCEs according to an example of the present invention. In FIG. 6, a 2*4 matrix is used for arranging 2 ECCEs (i.e., ECCE 0, ECCE 1) constituted by EREG 0-7 because K=2 and A=4, wherein the ECCE 0 includes the EREGs 0, 2, 4, 6, and the ECCE 1 includes the EREGs 1, 3, 5, 7.

In on example, the plurality of EREGs numbered with 0 to (A*K−1) may be generated (e.g., constituted) according to a localized scheme. That is, the plurality of EREGs numbered with 0 to (A*K−1) may be formed by the plurality of available REs numbered with 0 to (A*K−1) in the aggregated sSU. In other words, the localized scheme may be implemented by mapping the plurality of available REs numbered with 0 to (A*K−1) in the same aggregated sSU (e.g., indices of the plurality of EREGs) to the plurality of EREGs numbered with 0 to (A*K−1) (e.g., actual EREGs). In on example, the plurality of EREGs numbered with 0 to (A*K−1) may be generated (e.g., constituted) according to a distributed scheme. That is, the plurality of EREGs numbered with 0 to (A*K−1) may be formed by the plurality of available REs numbered with 0 to (A*K−1) in different aggregated sSUs. In other words, the distributed scheme may be implemented by mapping the plurality of available REs numbered with 0 to (A*K−1) in different aggregated sSU (e.g., indices of the plurality of EREGs) to the plurality of EREGs numbered with 0 to (A*K−1) (e.g., actual EREGs). In on example, the distributed scheme may be implemented according to a round robin algorithm.

In on example, the sEPDCCH position on N*K consecutive ECCEs may be determined according to a formula. In one example, the formula may be defined or newly defined in the 3GPP standard. It should be noted that, the network may not need to determine the formula, because the formula may be predetermined and is already known by the network and the UE.

In on example, the number of the plurality of EREGs in the ECCE (i.e., A) may be transmitted in (e.g., signaled as) system information. For example, the duration of the sTTI may be signaled as part of system information. In one example, the number of the plurality of EREGs in the ECCE may be transmitted in (e.g., signaled as) a higher layer signaling or a dynamic signaling. In one example, the number of the plurality of EREGs in the ECCE may be a predetermined duration newly defined in the 3GPP standard. It should be noted that, the network may not need to determine the number of the plurality of EREGs in the ECCE in Step 310, because the number of the plurality of EREGs in the ECCE may be predetermined and is already known by the network and the UE.

Figure 7A:
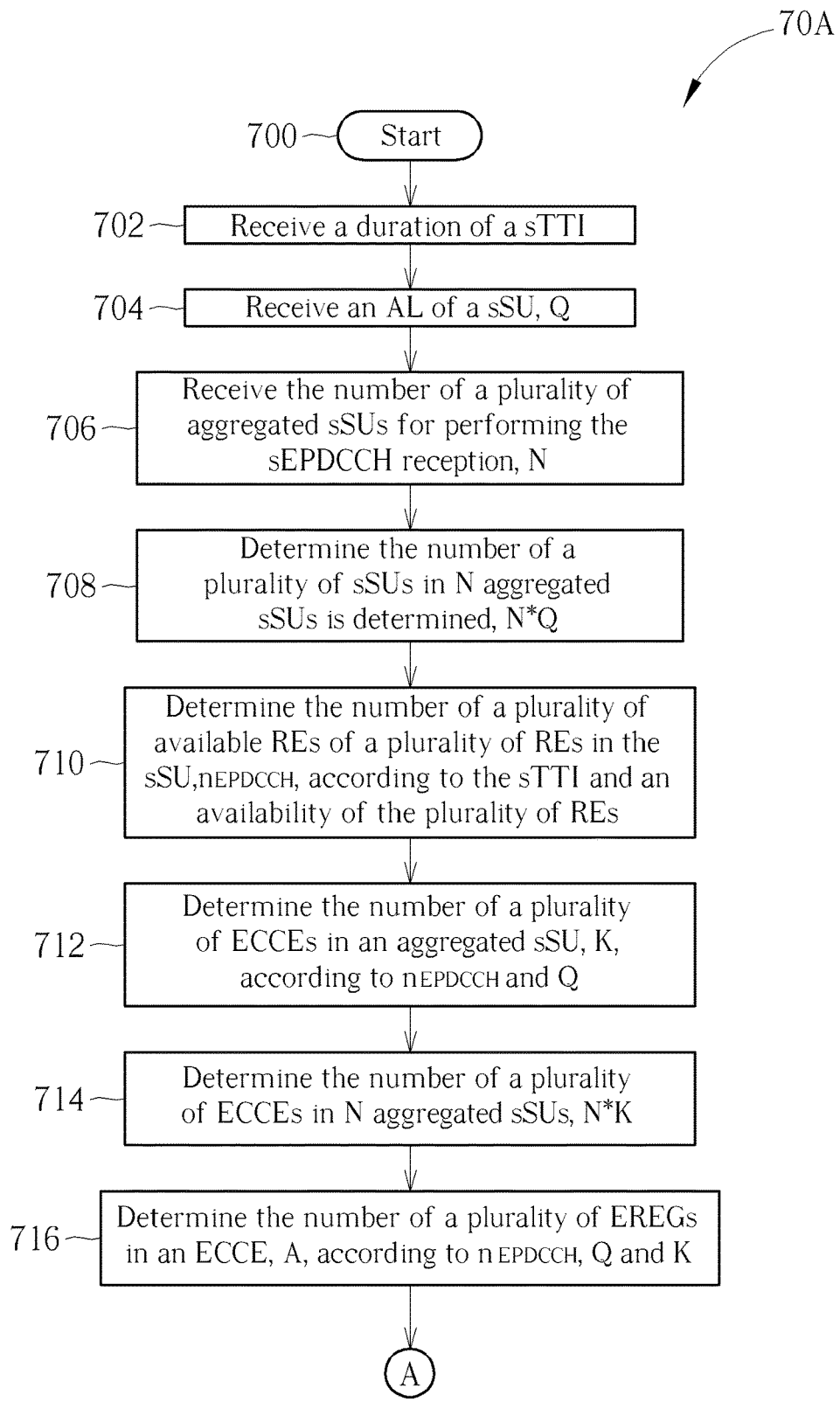
FIG. 7A is a flowchart of a process according to an example of the present invention.

FIG. 7A is a flowchart of a process 70A according to an example of the present invention. The process 70A may be utilized in a UE, to handle a sEPDCCH transmission in a wireless communication system. The process 70A includes the following steps:

Step 700: Start.
Step 702: Receive a duration of a sTTI.
Step 704: Receive an AL of a sSU, Q.
Step 706: Receive the number of a plurality of aggregated sSUs for performing the sEPDCCH reception, N.
Step 708: Determine the number of a plurality of sSUs in N aggregated sSUs is determined, N*Q.
Step 710: Determine the number of a plurality of available REs of a plurality of REs in the sSU, $n_{EPDCCH}$, according to the sTTI and an availability of the plurality of REs.
Step 712: Determine the number of a plurality of ECCEs in an aggregated sSU, K, according to $n_{EPDCCH}$ and Q.
Step 714: Determine the number of a plurality of ECCEs in N aggregated sSUs, N*K.
Step 716: Determine the number of a plurality of EREGs in an ECCE, A, according to $n_{EPDCCH}$, Q and K.

Figure 7B:
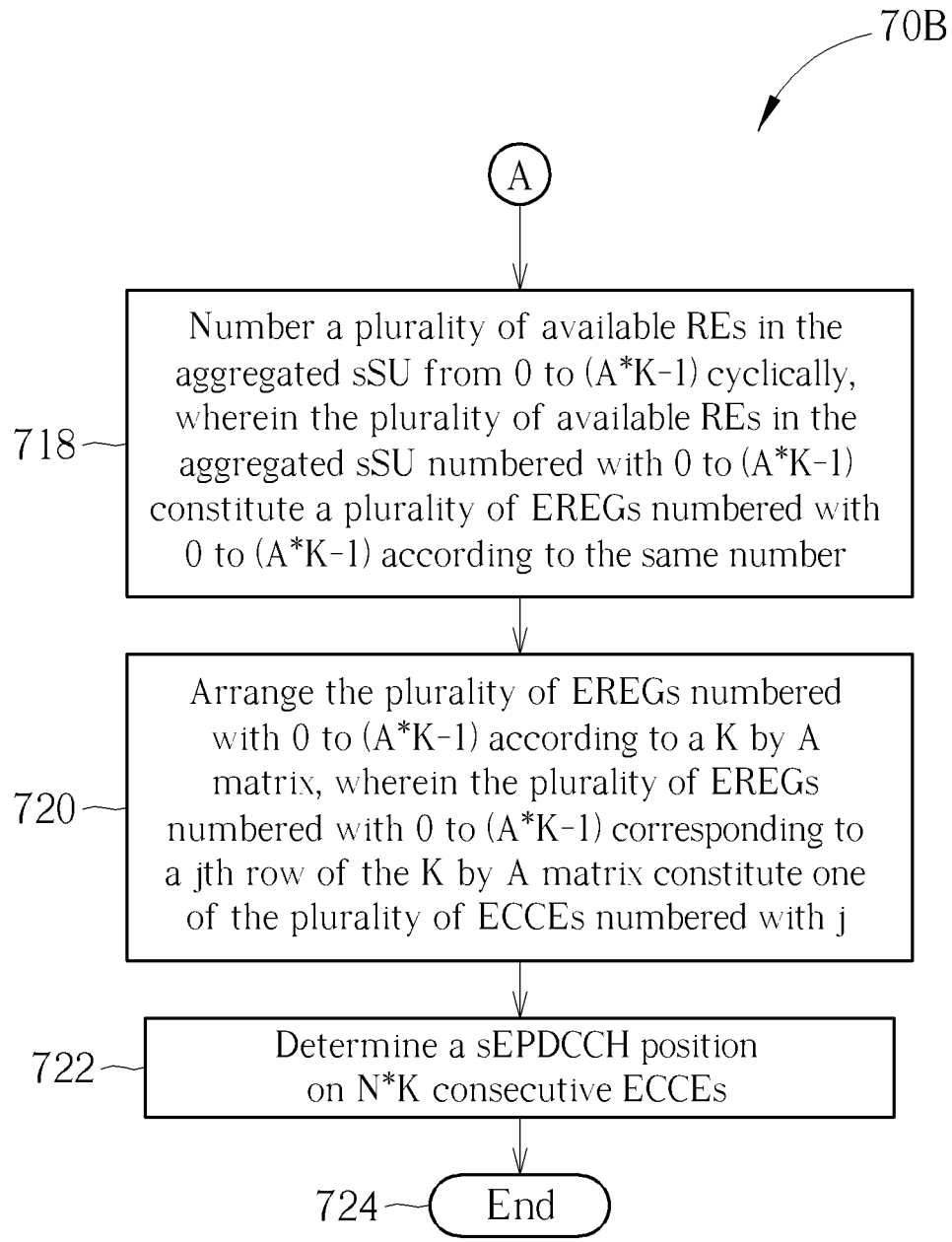
FIG. 7B is a flowchart of a process according to an example of the present invention.

A circle labeled with "A" is used to connect step 716 in FIG. 7A and step 718 in FIG. 7B.

FIG. 7B is a flowchart of a process 70B according to an example of the present invention. The process 70B is the subsequent steps of the process 70A. The process 70B includes the following steps:

Step 718: Number a plurality of available REs in the aggregated sSU from 0 to (A*K−1) cyclically, wherein the plurality of available REs in the aggregated sSU numbered with 0 to (A*K−1) constitute a plurality of EREGs numbered with 0 to (A*K−1) according to the same number.
Step 720: Arrange the plurality of EREGs numbered with 0 to (A*K−1) according to a K by A matrix, wherein the plurality of EREGs numbered with 0 to (A*K−1) corresponding to a jth row of the K by A matrix constitute one of the plurality of ECCEs numbered with j.
Step 722: Determine a sEPDCCH position on N*K consecutive ECCEs.
Step 724: End.

According to the processes 70A and 70B, the UE may receive a duration of a sTTI. The UE may receive an AL of a sSU, Q. The UE may receive the number of a plurality of aggregated sSUs for performing the sEPDCCH reception, N. Then, the UE may determine the number of a plurality of sSUs in N aggregated sSUs, N*Q. The UE may determine (e.g., counting) the number of a plurality of REs of a plurality of REs in a sSU, $n_{EPDCCH}$, according to the sTTI and an availability of the plurality of REs. The UE may determine the number of a plurality of ECCEs in an aggregated sSU, K, according to $n_{EPDCCH}$ and Q. Accordingly, the UE may determine the number of a plurality of ECCEs in N aggregated sSUs, N*K. The UE may determine the number of a plurality of EREGs in an ECCE, A, according to $n_{EPDCCH}$, Q and K. Then, the UE may number a plurality of available REs (e.g., which are not used for carrying necessary symbols at least for a demodulation purpose) in the aggregated sSU from 0 to (A*K−1) cyclically, wherein the plurality of available REs in the aggregated sSU numbered with 0 to (A*K−1) (e.g., i, wherein i is between 0 and (A*K−1)) constitute a plurality of EREGs numbered with 0 to (A*K−1) (e.g., i, wherein i is between 0 and (A*K−1)) according to the same number. The UE may arrange the plurality of EREGs numbered with 0 to (A*K−1) according to a K by A matrix (e.g., square), wherein the plurality of EREGs numbered with 0 to (A*K−1) corresponding to a jth row of the K by A matrix constitute one of the plurality of ECCEs numbered with j. Further, the UE may determine a sEPDCCH position on N*K consecutive ECCEs. That is, the network and the UE are able to transmit/receive the sEPD-CCH on a sEPDCCH position determined according to a sTTI, when the sTTI is used for transmitting/receiving the sEPDCCH. Thus, the sEPDCCH can be transmitted/received properly according to the processes 70A and 70B. As a result, the problem of the sEPDCCH transmission/reception in the prior art is solved.

Realization of the processes 70A and 70B is not limited to the above description.

In on example, the duration of the sTTI may be received in (e.g., signaled as) system information. For example, the duration of the sTTI may be signaled as part of system information. In one example, the duration of the sTTI may be received in (e.g., signaled as) a higher layer signaling or a dynamic signaling. In one example, the duration of the sTTI may be a predetermined duration newly defined in the 3GPP standard. It should be noted that, the UE may not need to receive the duration of the sTTI in Step 702, because the duration of the sTTI may be predetermined and is already known by the network and the UE.

In on example, the sSU may be a resource (e.g., time resource and/or frequency resource) including (e.g., corresponding to) 12 OFDM subcarriers in frequency domain. In one example, the sTTI may be shorter than a TTI (e.g., 1 ms or 14 OFDM symbols) defined in the 3GPP standard. In one example, the number of OFDM symbols in the sTTI may be less than 14 OFDM symbols according to a normal CP length. In one example, the number of OFDM symbols in the sTTI may be less than 12 OFDM symbols according to an extended CP length. In one example, the number of OFDM symbols in the sTTI may be 3 OFDM symbols. Accordingly, the sSU with the sTTI may correspond to 36 REs (i.e., 12*3).

In on example, the availability of the plurality of REs may be determined (e.g., counted) according to (e.g., fulfilled by) at least following conditions, such as being part of one of a plurality of EREGs in the sSU, not being used for at least one cell-specific reference signal or at least one CSI reference signal, and not being part of a control region of a PDCCH.

In on example, the AL of the sSU (i.e., Q) may be received in (e.g., signaled as) system information. In one example, the AL of the sSU may be received in (e.g., signaled as) a higher layer signaling or a dynamic signaling. In one example, the AL of the sSU may be a predetermined AL newly defined in the 3GPP standard. For example, Q may be 1, if the number of OFDM symbols in the sTTI is more than 7 OFDM symbols. Q may be 2, if the number of OFDM symbols in the sTTI is less than 7 OFDM symbols and more than 3 OFDM symbols. Q may be 3, if the number of OFDM symbols in the sTTI is less than 3 OFDM symbols. For another example, Q may be 1, if $n_{EPDCCH}$ is more than 84 REs. Q may be 2, if $n_{EPDCCH}$ is less than 84 REs and more than 36 REs. Q may be 3, if $n_{EPDCCH}$ is less than 36 REs. It should be noted that, the UE may not need to receive the AL of the sSU (i.e., Q) in Step 704, because the AL of the sSU (i.e., Q) may be predetermined and is already known by the network and the UE.

In on example, the aggregated sSU may be located (e.g., on the time resource and/or frequency resource) consecutively. In one example, the aggregated sSU may be located (e.g., on the time resource and/or frequency resource) non-consecutively. The present example can be illustrated by using FIG. 4, and is not narrated herein.

In on example, K may be determined (e.g., as a largest positive integer) according to the equation (Eq.1). Related description can be referred to the previous description, and is not narrated herein.

In on example, $n_{threshold}$ may be determined according to a highest acceptable coding rate of DCI (e.g., due to that less REs are used for coding). For example, the highest acceptable coding rate of the DCI may be 0.77. For the DCI with a total number of 40 information bits, $n_{threshold}$ is determined as 26 REs. Accordingly, a coding rate of 0.769 (i.e., 40/(26*2)≈0.769) is given.

In on example, $n_{threshold}$ is determined according to a factor (e.g., a) related to a shrunken proportion between the sTTI and a TTI defined in the 3GPP standard, and the factor is between 0 and 1.0. In one example, $n_{threshold}$ may be transmitted in (e.g., signaled as) a higher layer signaling. In one example, $n_{threshold}$ may be a predetermined factor newly defined in the 3GPP standard. It should be noted that, the UE may not need to determine $n_{threshold}$, because the factor may be predetermined and is already known by the network and the UE. In one example, the factor may be 1.0 and $n_{threshold}$ may be 26 REs, if DCI formats used for the LTE system supported by reduced latency are kept unchanged (i.e., without latency reduction). In one example, the factor may be 0.5 and $n_{threshold}$ may be 13 REs, if the DCI formats used for the LTE system supported by reduced latency is shrunk to ½ of the original size.

In on example, A is determined according to the equation (Eq. 2). In on example, the plurality of available REs in the aggregated sSU may be numbered from 0 to (A*K−1) cyclically and across (i.e., cross sSUs in the aggregated sSU) according to an increasing order in frequency domain (e.g., from the first position of the frequency domain) and followed by an increasing order in time domain. In on example, the plurality of available REs in the aggregated sSU may be numbered from 0 to (A*K−1) cyclically and non-across (i.e., not cross sSUs in the aggregated sSU, one sSU by one sSU) according to an increasing order in frequency domain (e.g., from the first position of the frequency) and followed by an increasing order in time domain. It should be noted that, the UE may not need to determine the numbering scheme mentioned above, because the numbering scheme may be predetermined and is already known by the network and the UE.

In on example, the K by A matrix may be arranged according to an increasing order in row (e.g., first row) and followed by an increasing order in column. It should be noted that, the UE may not need to determine the arrangement scheme mentioned above, because the arrangement scheme may be predetermined and is already known by the network and the UE.

In on example, the plurality of ECCEs in N aggregated sSUs (i.e., N*K ECCEs) may be numbered from the first sSU in frequency domain (e.g., position) according to an increasing order. The present example can be illustrated by using FIG. 5, and is not narrated herein.

In on example, the plurality of EREGs numbered with 0 to (A*K−1) may be generated (e.g., constituted) according to a localized scheme. That is, the plurality of EREGs numbered with 0 to (A*K−1) may be formed by the plurality of available REs numbered with 0 to (A*K−1) in the aggregated sSU. In other words, the localized scheme may be implemented by mapping the plurality of available REs numbered with 0 to (A*K−1) in the same aggregated sSU (e.g., indices of the plurality of EREGs) to the plurality of EREGs numbered with 0 to (A*K−1) (e.g., actual EREGs). In on example, the plurality of EREGs numbered with 0 to (A*K−1) may be generated (e.g., constituted) according to a distributed scheme. That is, the plurality of EREGs numbered with 0 to (A*K−1) may be formed by the plurality of available REs numbered with 0 to (A*K−1) in different aggregated sSUs. In other words, the distributed scheme may be implemented by mapping the plurality of available REs numbered with 0 to (A*K−1) in different aggregated sSU (e.g., indices of the plurality of EREGs) to the plurality of EREGs numbered with 0 to (A*K−1) (e.g., actual EREGs). In on example, the distributed scheme may be implemented according to a round robin algorithm.

In on example, the sEPDCCH position on N*K consecutive ECCEs may be determined according to a blind detection and a formula. In one example, the formula may be defined or newly defined in the 3GPP standard. It should be noted that, the UE may not need to determine the formula, because the formula may be predetermined and is already known by the network and the UE.

In on example, the number of the plurality of EREGs in the ECCE (i.e., A) may be received in (e.g., signaled as) system information. For example, the duration of the sTTI may be signaled as part of system information. In one example, the number of the plurality of EREGs in the ECCE may be received in (e.g., signaled as) a higher layer signaling or a dynamic signaling. In one example, the number of the plurality of EREGs in the ECCE may be a predetermined duration newly defined in the 3GPP standard. It should be noted that, the UE may not need to determine the number of the plurality of EREGs in the ECCE in Step 716, because the number of the plurality of EREGs in the ECCE may be predetermined and is already known by the network and the UE.

Figure 8:
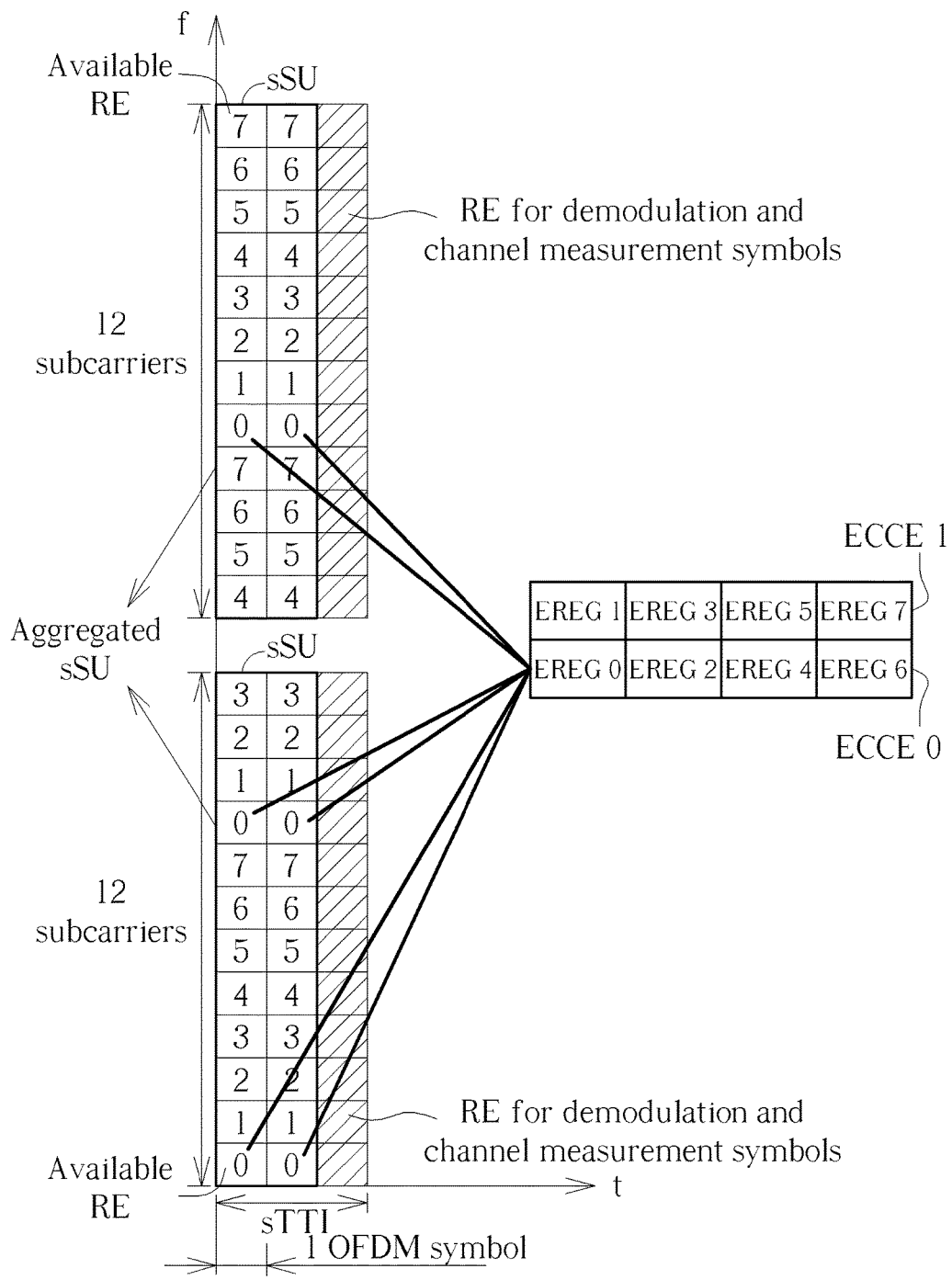
FIG. 8 is a schematic diagram according to an example of the present invention.

An example is illustrated as following and in FIG. 8 according to the processes 30 and 70. As shown in FIG. 8, a duration of a sTTI is determined as 3 OFDM symbols. $n_{EPDCCH}$ is determined as 24 REs (i.e., 3*12−12=24), if the number of REs for demodulation and channel measurement symbols is assumed as 12 REs. An AL of the sSU is determined as 2, and $n_{threshold}$ is determined as 13 REs according to the example mentioned above (e.g., the factor is 0.5). K is determined as 2, if an AL of the ECCE is assumed as 1, i.e., d=0. It can be shown that the equation of A is satisfied, if A is determined as 4. Then, all the REs within the 2 selected sSUs for aggregation may be numbered cyclically and across (i.e., cross the 2 selected sSUs) from 0 to 7. All the REs numbered with i (e.g., 0, as shown in FIG. 8) are constituted (i.e., correspond) to the EREG i (e.g., the EREG 0, as shown in FIG. 8), wherein i is between 0 and 7. Then, the EREGs 0-7 are arranged by a K by A matrix (i.e., 2*4 matrix), which is used for arranging 2 ECCEs (i.e., the ECCEs 0, 1) constituted by the EREGs 0-7. As shown in FIG. 8, the ECCE 0 is constituted by the EREGs 0, 2, 4, 6, and the ECCE 1 is constituted by the EREGs 1, 3, 5, 7. Then, the network transmits a sEPDCCH on the 2 aforementioned ECCEs by using a predetermined formula for deciding the sEPDCCH candidate positions, if N is assumed as 1. The UE recovers the sEPDCCH by understanding the procedures for producing the sEPDCCH and blindly detects on the scheduled time resource and/or frequency resource.

Figure 9:
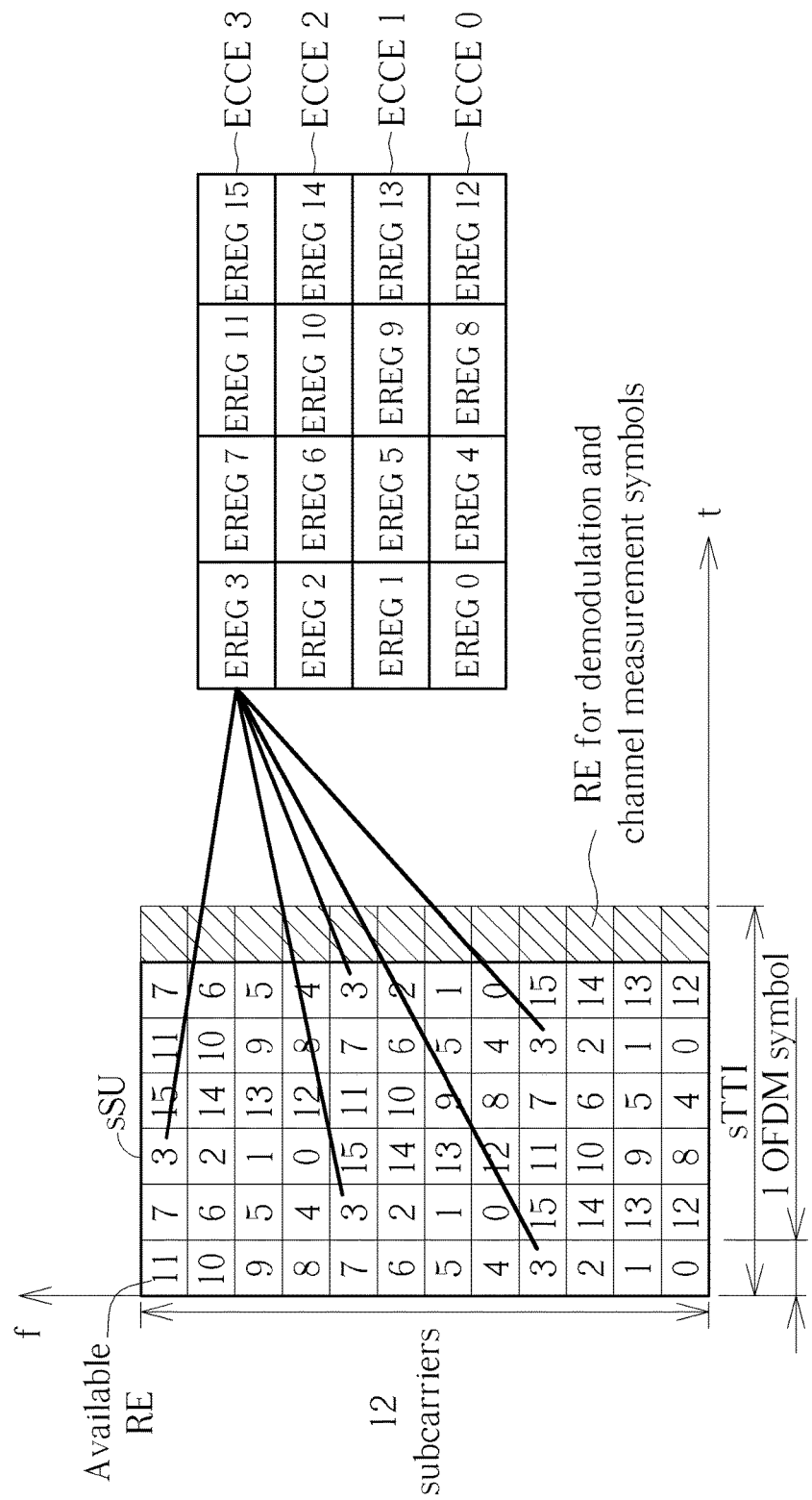
FIG. 9 is a schematic diagram according to an example of the present invention.

Another example is illustrated as following and in FIG. 9 according to the processes 30 and 70. As shown in FIG. 9, a duration of a sTTI is determined as 7 OFDM symbols. $n_{EPDCCH}$ is determined as 72 REs (i.e., 7*12−12=72), if the number of REs for demodulation and channel measurement symbols is assumed as 12 REs. An AL of the sSU is determined as 1, and $n_{threshold}$ is determined as 13 REs according to the example mentioned above (e.g., the factor is 0.5). K is determined as 4, if an AL of the ECCE is assumed as 1, i.e., d=0. It can be shown that the equation of A is satisfied, if A is determined as 4. Then, all the REs within the 1 selected sSU for aggregation may be numbered cyclically and non-across (i.e., because the AL of the sSU is 1) from 0 to 15. All the REs numbered with i (e.g., 3, as shown in FIG. 9) are constituted (i.e., correspond) to the EREG i (e.g., the EREG 3, as shown in FIG. 9), wherein i is between 0 and 15. Then, the EREGs 0-15 are arranged by a K by A matrix (i.e., 4*4 matrix), which is used for arranging 4 ECCEs (i.e., the ECCEs 0, 1, 2, 3) constituted by the EREGs 0-15. As shown in FIG. 9, the ECCE 0 is constituted by the EREGs 0, 4, 8, 12, the ECCE 1 is constituted by the EREGs 1, 5, 9, 13, the ECCE 2 is constituted by the EREGs 2, 6, 10, 14, and the ECCE 3 is constituted by the EREGs 3, 7, 11, 15. Then, the network transmits a sEPDCCH on the 4 aforementioned ECCEs by using a predetermined formula for deciding the sEPDCCH candidate positions, if N is assumed as 1. The UE recovers the sEPDCCH by understanding the procedures for producing the sEPDCCH and blindly detects on the scheduled time resource and/or frequency resource.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. Any of the abovementioned processes may be compiled into the program code 214. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means be the communication device 20.

To sum up, the present invention provides a method and related communication device for handling a sEPDCCH in a wireless communication system. The network and the UE are able to transmit/receive the sEPDCCH on a sEPDCCH position determined according to a sTTI, when the sTTI is used for transmitting/receiving the sEPDCCH. Thus, the sEPDCCH can be transmitted/received properly according to the present invention. As a result, the problem of the sEPDCCH transmission/reception in the prior art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network of handling a shortened enhanced physical downlink control channel (sEPDCCH) transmission, comprising:
   a storage device; and
   a processing circuit, coupled to the storage device, wherein the storage device stores, and the processing circuit is configured to execute instructions of:
   determining a duration of a shortened transmission time interval (sTTI);
   determining the number of a plurality of available resource elements (REs) of a plurality of REs in a shortened scheduling unit(sSU), $n_{EPDCCH}$, according to the sTTI and an availability of the plurality of REs;

determining an aggregated level (AL) of the sSU, Q, according to the sTTI and $n_{EPDCCH}$;

determining the number of a plurality of enhanced control channel elements (ECCEs) in an aggregated sSU, K, according to $n_{EPDCCH}$ and Q;

determining the number of a plurality of enhanced resource element groups (EREGs) in an ECCE, A, according to $n_{EPDCCH}$, Q and K;

numbering a plurality of available REs in the aggregated sSU from 0 to (A*K−1) cyclically, wherein the plurality of available REs in the aggregated sSU numbered with 0 to (A*K−1) constitute a plurality of EREGs numbered with 0 to (A*K−1) according to the same number;

arranging the plurality of EREGs numbered with 0 to (A*K−1) according to a K by A matrix, wherein the plurality of EREGs numbered with 0 to (A*K−1) corresponding to a jth row of the K by A matrix constitute one of the plurality of ECCEs numbered with j;

determining the number of a plurality of aggregated sSUs for performing the sEPDCCH transmission, N, according to channel bandwidth, channel state information (CSI) and downlink control information (DCI);

determining the number of a plurality of ECCEs in N aggregated sSUs, N*K; and determining a sEPDCCH position on N*K consecutive ECCEs;

wherein the duration of the sTTI is transmitted in system information, or is transmitted in a higher layer signaling or a dynamic signaling.

2. The network of claim 1, wherein the sSU is a resource comprising 12 orthogonal frequency-division multiplexing (OFDM) subcarriers in frequency domain, and the sTTI is shorter than a TTI defined in the 3rd generation partner project (3GPP) standard.

3. The network of claim 1, wherein the availability of the plurality of REs is determined according to at least following conditions:

being part of one of a plurality of EREGs in the sSU;

not being used for at least one cell-specific reference signal or at least one CSI reference signal; and not being part of a control region of a PDCCH.

4. The network of claim 1, wherein K is determined according to the following equation:

$$2^d \frac{Q * n_{EPDCCH}}{K} \geq n_{threshold} \text{ and } K = 2^b;$$

wherein $2^d$ is an AL of the ECCE, b and d are nonnegative integers, $n_{threshold}$ is a smallest acceptable number of a plurality of REs for transmitting the sEPDCCH.

5. The network of claim 4, wherein $n_{threshold}$ is determined according to a highest acceptable coding rate of the DCI.

6. The network of claim 1, wherein A is determined according to the following equation:

$$A * K \leq Q * n_{EPDCCH}.$$

7. The network of claim 1, wherein the plurality of available REs in the aggregated sSU are numbered from 0 to (A*K−1) cyclically and across according to an increasing order in frequency domain and followed by an increasing order in time domain, or are numbered from 0 to (A*K−1) cyclically and non-across according to an increasing order in frequency domain and followed by an increasing order in time domain.

8. The network of claim 1, wherein the K by A square is arranged according to an increasing order in row and followed by an increasing order in column.

9. The network of claim 1, wherein the plurality of ECCEs in N aggregated sSUs are numbered from the first sSU in frequency domain according to an increasing order.

10. A communication device of handling a shortened enhanced physical downlink control channel (sEPDCCH) reception, comprising:

a storage device; and a processing circuit, coupled to the storage device, wherein the storage device stores, and the processing circuit is configured to execute instructions of:

receiving a duration of a shortened transmission time interval (sTTI);

receiving an aggregated level (AL) of a shortened scheduling unit(sSU), Q;

receiving the number of a plurality of aggregated sSUs for performing the sEPDCCH reception, N;

determining the number of a plurality of sSUs in N aggregated sSUs, N*Q;

determining the number of a plurality of available resource elements (REs) of a plurality of REs in the sSU, $n_{EPDCCH}$, according to the sTTI and an availability of the plurality of REs;

determining the number of a plurality of enhanced control channel elements (ECCEs) in an aggregated sSU, K, according to $n_{EPDCCH}$ and Q;

determining the number of a plurality of ECCEs in N aggregated sSUs, N*K;

determining the number of a plurality of enhanced resource element groups (EREGs) in an ECCE, A, according to $n_{EPDCCH}$, Q and K;

numbering a plurality of available REs in the aggregated sSU from 0 to (A*K−1) cyclically, wherein the plurality of available REs in the aggregated sSU numbered with 0 to (A*K−1) constitute a plurality of EREGs numbered with 0 to (A*K−1) according to the same number;

arranging the plurality of EREGs numbered with 0 to (A*K−1) according to a K by A matrix, wherein the plurality of EREGs numbered with 0 to (A*K−1) corresponding to a jth row of the K by A matrix constitute one of the plurality of ECCEs numbered with j; and determining a sEPDCCH position on N*K consecutive ECCEs;

wherein the duration of the sTTI is received in system information, or is received in a higher layer signaling or a dynamic signaling.

11. The communication device of claim 10, wherein the sSU is a resource comprising 12 orthogonal frequency-division multiplexing (OFDM) subcarriers in frequency domain, and the sTTI is shorter than a TTI defined in the 3rd generation partner project (3GPP) standard.

12. The communication device of claim 10, wherein the availability of the plurality of REs is determined according to at least following conditions:

being part of one of a plurality of EREGs in the sSU;

not being used for at least one cell-specific reference signal or at least one channel state information (CSI) reference signal; and not being part of a control region of a PDCCH.

13. The communication device of claim 10, wherein K is determined according to the following equation:

$$2^d \frac{Q * n_{EPDCCH}}{K} \geq n_{threshold} \text{ and } K = 2^b;$$

wherein $2^d$ is an AL of the ECCE, b and d are nonnegative integers, $n_{threshold}$ is a smallest acceptable number of a plurality of REs for transmitting the sEPDCCH.

14. The communication device of claim 13, wherein $n_{threshold}$ is determined according to a highest acceptable coding rate of DCI.

15. The communication device of claim 10, wherein A is determined according to the following equation:

$$A*K<Q*n_{EPDCCH}.$$

16. The communication device of claim 10, wherein the plurality of available REs in the aggregated sSU are numbered from 0 to (A*K−1) cyclically and across according to an increasing order in frequency domain and followed by an increasing order in time domain, or are numbered from 0 to (A*K−1) cyclically and non-across according to an increasing order in frequency domain and followed by an increasing order in time domain.

17. The communication device of claim 10, wherein the K by A matrix is arranged according to an increasing order in row and followed by an increasing order in column.

18. The communication device of claim 10, wherein the plurality of ECCEs in N aggregated sSUs are numbered from the first sSU in frequency domain according to an increasing order.

* * * * *